United States Patent [19]
Mazewski et al.

[11] Patent Number: 5,538,635
[45] Date of Patent: Jul. 23, 1996

[54] METHOD FOR DISSOLVING GAS IN LIQUID INCLUDING PRESSURIZED BUBBLE CONTACTOR IN SIDESTREAM

[75] Inventors: Eugene E. Mazewski, Pewaukee; Peter J. Petit, Brookfield, both of Wis.; Richard E. Speece, Nashville, Tenn.

[73] Assignee: Envirex, Inc., Waukesha, Wis.

[21] Appl. No.: 367,803

[22] Filed: Dec. 30, 1994

Related U.S. Application Data

[62] Division of Ser. No. 972,742, Nov. 6, 1992, Pat. No. 5,411,660.

[51] Int. Cl.$^6$ ...................................................... C02F 3/06
[52] U.S. Cl. ........................ 210/617; 210/621; 210/758; 210/765
[58] Field of Search ................... 210/615–618, 210/620–623, 150, 151, 194, 196, 205, 758, 765

[56] References Cited

U.S. PATENT DOCUMENTS

| | | | |
|---|---|---|---|
| 1,139,024 | 5/1915 | Frank . | |
| 2,160,832 | 6/1939 | Contant | 210/14 |
| 3,043,433 | 7/1962 | Singer | 210/197 |
| 3,643,403 | 2/1972 | Speece | 261/91 |
| 3,804,255 | 4/1974 | Speece | 210/194 |
| 3,846,289 | 11/1974 | Jeris et al. | 210/617 |
| 3,926,588 | 12/1975 | Speece | 210/194 |
| 3,956,128 | 5/1976 | Turner | 210/150 |
| 3,956,129 | 5/1976 | Jeris et al. | 210/195.1 |
| 4,009,098 | 2/1977 | Jeris | 210/617 |
| 4,009,099 | 2/1977 | Jeris | 210/151 |
| 4,009,105 | 2/1977 | Jeris | 210/151 |
| 4,124,508 | 11/1978 | Capetanopoulos | 210/194 |
| 4,136,747 | 1/1979 | Mallory et al. | 175/66 |
| 4,171,263 | 10/1979 | Roberts, Jr. et al. | 210/8 |
| 4,182,675 | 1/1980 | Jeris | 210/617 |
| 4,202,774 | 5/1980 | Kos | 210/274 |
| 4,246,111 | 1/1981 | Savard et al. | 210/220 |
| 4,370,151 | 1/1983 | Herbrechtsmeier | 210/220 |
| 4,412,924 | 11/1983 | Feather | 210/218 |
| 4,466,928 | 8/1984 | Kos | 210/221.2 |
| 4,469,599 | 9/1984 | Gros et al. | 210/150 |
| 4,477,393 | 10/1984 | Kos | 210/221.2 |
| 4,507,253 | 3/1985 | Wiesmann | 210/221.2 |
| 4,515,754 | 5/1985 | Stehning | 422/168 |
| 4,664,680 | 5/1987 | Weber | 55/48 |
| 5,011,597 | 4/1991 | Canzoneri et al. | 210/194 |
| 5,167,806 | 12/1992 | Wang et al. | 210/205 |
| 5,228,997 | 7/1993 | Martin et al. | 210/617 |

FOREIGN PATENT DOCUMENTS

| | | |
|---|---|---|
| 2159366 | 6/1972 | Germany . |
| 82-122997 | 7/1982 | Japan . |

OTHER PUBLICATIONS

The Japanese Government Patent Office, "Patent Abstracts of Japan", vol. 14, No. 386, Aug. 21, 1990.

*Primary Examiner*—Thomas G. Wyse
*Attorney, Agent, or Firm*—Michael, Best & Friedrich

[57] ABSTRACT

A liquid treatment apparatus for removing potentially combustible substances from water includes a biological fluid bed reactor that is supplied by a first conduit with contaminated water and that treats this water, under aerobic conditions, before discharging it as treated effluent containing a significantly reduced concentration of contaminants. The liquid treatment apparatus also includes a gas dissolution apparatus for providing dissolved oxygen to the contaminated water flowing through the first conduit to sustain biological action in the reactor. The gas dissolution apparatus includes an oxygenator including a pressurized bubble contactor disposed in a recycle conduit connected between the outlet of the reactor and the first conduit.

7 Claims, 3 Drawing Sheets

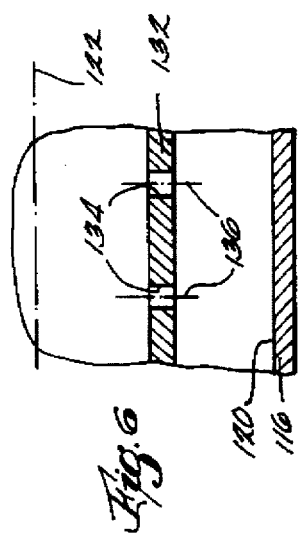
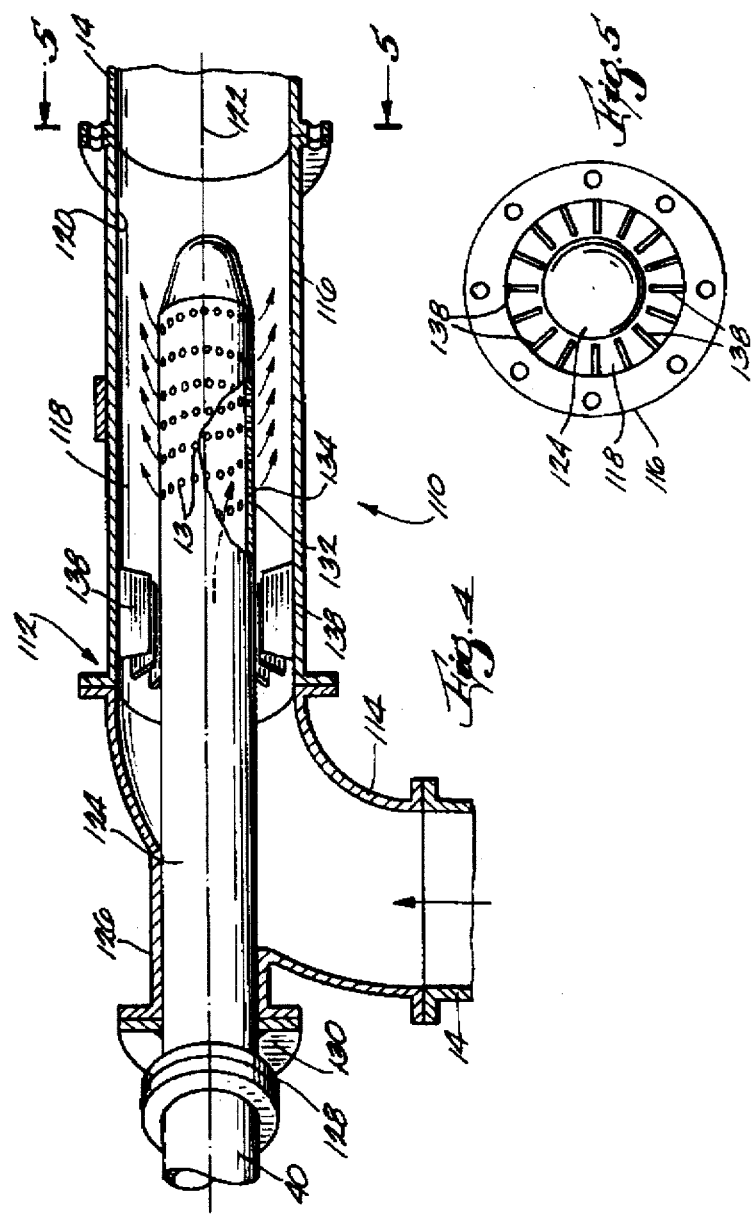
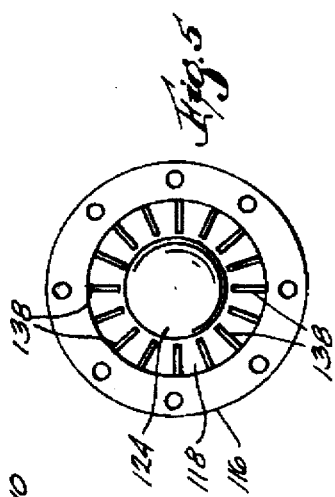

5,538,635

METHOD FOR DISSOLVING GAS IN LIQUID INCLUDING PRESSURIZED BUBBLE CONTACTOR IN SIDESTREAM

This is a division of co-pending U.S. patent application Ser. No. 972,742 filed Nov. 6, 1992, now allowed

BACKGROUND OF THE INVENTION

1. Field of the Invention

The invention relates to an apparatus for treating contaminated liquid, and more particularly to an apparatus including a fluid bed reactor and an apparatus for dissolving a gas, such as oxygen, into the liquid entering the reactor.

2. Reference to Prior Art

In many processes it is desirable to dissolve gases in liquids. In one such process an apparatus for dissolving oxygen in water is employed in a water treatment system for removing fuel constituents from water contaminated thereby. The apparatus for dissolving oxygen in water, or "oxygenator", includes a bubble contactor into which oxygen and a stream of contaminated water are introduced to dissolve the oxygen in the water. To safeguard against the build-up of a potentially combustible mixture of fuel constituents and gaseous oxygen, the bubble contactor is provided with auxiliary equipment. This equipment includes recirculation equipment including an eductor circuit to recirculate undissolved oxygen and a vent circuit to purge undissolved gas in excess of that which the recirculation equipment can accommodate. The vented gas can include significant amounts of oxygen which is expensive to produce. Following "oxygenation", the contaminated water is biologically treated in a fluid bed reactor in which the water is passed through a bed of particulate solids serving as a substrate for microorganisms. The microorganisms consume, under aerobic conditions, the fuel constituents in the water. The principles of operation of fluid bed biological reactors are provided in the following U.S. patents: U.S. Pat. No. 4,202,774 issued May 13, 1980 to Kos; U.S. Pat. Nos. 4,009,098, 4,009,099 and 4,009,105 all issued Feb. 22, 1977 to Jeris; and U.S. Pat. No. 3,956,129 issued May 11, 1976 and U.S. Pat. No. 3,846,289 issued Nov. 5, 1974, both to Jeris et al.

Another example of the use of an oxygenator is provided in U.S. Pat. No. 4,477,393, issued Oct. 16, 1984 to Kos. This oxygenator is employed in a treatment process to denitrify waste water. To pressurize the water in order to increase the rate and extent of oxygen dissolution the oxygenator is installed below ground, beneath a hydrostatic head.

Further examples of apparatus for dissolving gas in liquid are provided in U.S. Pat. No. 4,466,928 issued Aug. 21, 1984 to Kos and in U.S. Pat. No. 3,926,588 issued Dec. 16, 1974 to Speece. The Speece patent discloses a pressurized gas transfer system for dissolving oxygen in water. The Speece gas transfer system includes parallel pipe circuits through which water is alternately pumped into a conically-shaped bubble contactor. Gas bubbles containing oxygen are introduced into the bubble contactor to oxygenate the water.

In prior art arrangements, all of the liquid which is to be treated is first passed through an oxygenator and the oxygenator and associated equipment are sized accordingly to handle large flow rates.

SUMMARY OF THE INVENTION

The invention provides an improved liquid treatment apparatus arranged to efficiently and economically treat waste water. While a liquid treatment apparatus embodying the invention could be used to treat various industrial or municipal waste waters, in one embodiment the liquid treatment apparatus is used to remove potentially combustible contaminants from a liquid and to reduce the combustion potential of the contaminants by limiting the opportunity for these contaminants to combine with gaseous oxygen. The liquid treatment apparatus includes a fluid bed reactor and an apparatus for dissolving gas in liquid, that apparatus including a pressurized bubble contactor positioned in a sidestream containing reduced amounts of combustible contaminants. The gas dissolution apparatus is operated to mix sidestream liquid having a high dissolved gas content with the contaminated liquid having a lower dissolved gas content to thereby produce a liquid supplied to the fluid bed reactor, that liquid having an intermediate dissolved gas content sufficient to support biological action in the reactor.

More specifically, the invention provides a liquid treatment apparatus for removing potentially combustible substances, such as fuel constituents, from contaminated water. The liquid treatment apparatus includes a biological fluid bed reactor that is supplied by a main conduit with contaminated water and that treats this water, under aerobic conditions, before discharging it as treated effluent having a significantly reduced concentration of contaminants. The liquid treatment apparatus also includes a gas dissolution apparatus for providing dissolved oxygen to the water flowing to the reactor through the main conduit. The gas dissolution apparatus includes a bubble contactor disposed in a recycle conduit that withdraws treated effluent from the reactor. This treated effluent is oxygenated in the bubble contactor and this oxygenated liquid is then mixed with the water in the main conduit upstream of the reactor in order to supply that water with sufficient amounts of dissolved oxygen to sustain biological action in the reactor. By placing the bubble contactor in a sidestream (e.g. the recycle stream) to oxygenate liquid having a reduced concentration of potentially combustible contaminants (e.g. the treated reactor effluent) the chance of developing a combustible mixture of contaminants and oxygen in the bubble contactor is reduced.

The gas dissolution apparatus also includes a pump to pressurize the bubble contactor. By utilizing a pressurized bubble contactor the solubility of the oxygen is increased so that substantially 100% of the oxygen introduced by the oxygenator is dissolved. Complete oxygen dissolution eliminates the need for gas recirculation equipment. Additionally, by pressurizing the bubble contactor a higher dissolved oxygen content can be achieved in the recycled effluent so that the flow rate of this liquid can be reduced. This results in a decreased size and cost of the gas dissolution apparatus relative to prior art arrangements.

Other features and advantages of the invention will become apparent to those skilled in the art upon review of the following detailed description, claims and drawings.

BRIEF DESCRIPTION OF THE DRAWINGS

FIG. 4 is an enlarged, partially sectional side perspective view of another portion of the gas dissolution apparatus illustrated in FIG. 1 and showing a mixing device that is positioned at the junction of the main conduit and the recycle conduit.

FIG. 5 is a view of the mixing device taken along line 5—5 in FIG. 4.

FIG. 6 is an enlarged view of a portion of the mixing device illustrated in FIG. 4.

Figure 1:
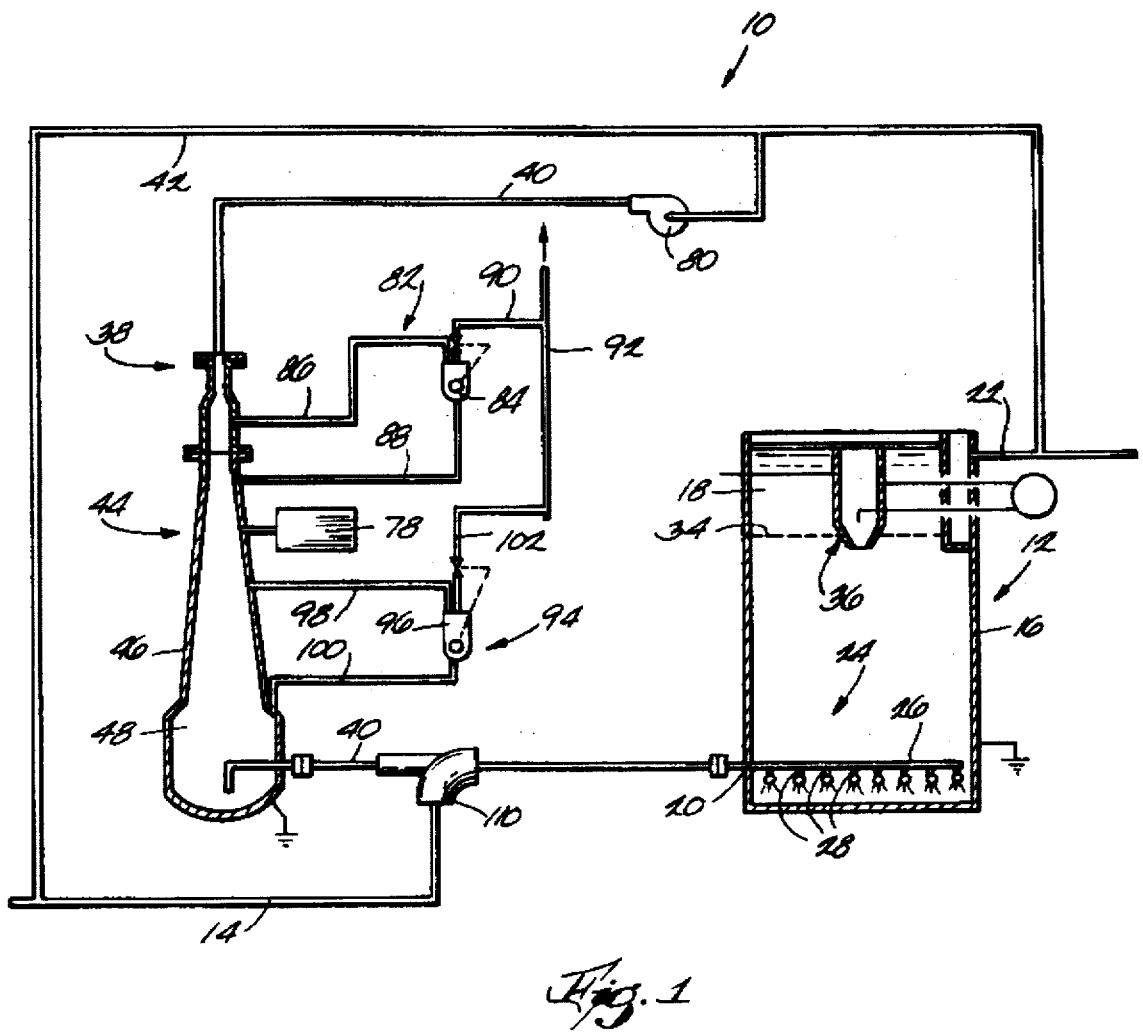
FIG. 1 is a schematic view, partially in section, of a liquid treatment apparatus including a gas dissolution apparatus for dissolving a gas in a liquid.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Illustrated in FIG. 1 is a liquid treatment apparatus 10 embodying the invention. While the treatment apparatus 10 can be used in other applications, in the embodiment described herein the treatment apparatus 10 is used to remove potentially combustible contaminants including fuel constituents from groundwater tainted by sources such as refineries, leaky underground fuel storage tanks, and the like. The fuel constituents can include, for example, benzene, toluene, ethylbenzene, xylene (BTEXs) and other hydrocarbon compounds.

To accommodate clean-up of fuel spills of varying magnitudes, the liquid treatment apparatus 10 can be variously sized. For example, the liquid treatment apparatus 10 can be constructed as a self-contained unit mounted on skids (not shown) or other supports to facilitate transport of the unit to different sites. Alternatively, if desired, the liquid treatment apparatus 10 can be constructed as part of a large permanent installation for the treatment of a large spill. Additionally, the liquid treatment apparatus 10 can be used in series or in parallel with similar apparatus or with other systems depending on treatment requirements.

The liquid treatment apparatus 10 includes a liquid processing or treatment device which in the illustrated arrangement is a biological fluid bed reactor 12 and a main supply line or conduit 14 for delivering water to be treated to the reactor 12. The reactor 12 includes a reactor tank 16 defining a treatment chamber 18 and including an inlet 20 connected to the main conduit 14 and an outlet 22. The reactor 12 also includes a flow distributor 24 at the base of the reactor tank 16 and including a header member 26 communicating with the inlet 20. The header member 26 is manifolded to a plurality of nozzles for delivering the water to be treated into the treatment chamber 18.

To decontaminate the water flowing through the reactor tank 16, the reactor 12 includes a bed 34 comprised of particulate solids, preferably granular activated carbon or sand, and microorganisms carried on the particulate solids. Under aerobic conditions, the microorganisms consume fuel constituents to produce less noxious by-products including cellular growth. To remove excessive cellular growth, the reactor 12 is provided with an excess growth control system 36. Examples of suitable excess growth control systems are provided in U.S. Pat. No. 4,177,144 issued Dec. 4, 1979 to Hickey et al. and U.S. Pat. No. 4,250,033 issued Feb. 10, 1981 also to Hickey.

The liquid treatment apparatus 10 also includes means for providing a dissolved gas to the water in the main conduit 14. In the illustrated embodiment, dissolved oxygen is provided to support biological action in the reactor and the means for providing dissolved oxygen includes a source of liquid preferably containing a minimum amount of combustible contaminants and a gas dissolution apparatus 38. While various liquid sources, such as a municipal water supply for example, can be used, in the illustrated arrangement the treated effluent of the reactor 12 serves as the liquid source and the gas dissolution apparatus 38 includes a recycle conduit 40 connected to the outlet 22 for delivering recycled effluent to the gas dissolution apparatus 38. The treated effluent has a concentration of combustible contaminants (e.g. fuel constituents) which is an order of magnitude or more less than the concentration of such contaminants in the water entering the reactor 12. An optional overflow conduit 42 that normally carries no net flow is also provided.

Figures 2, 3:
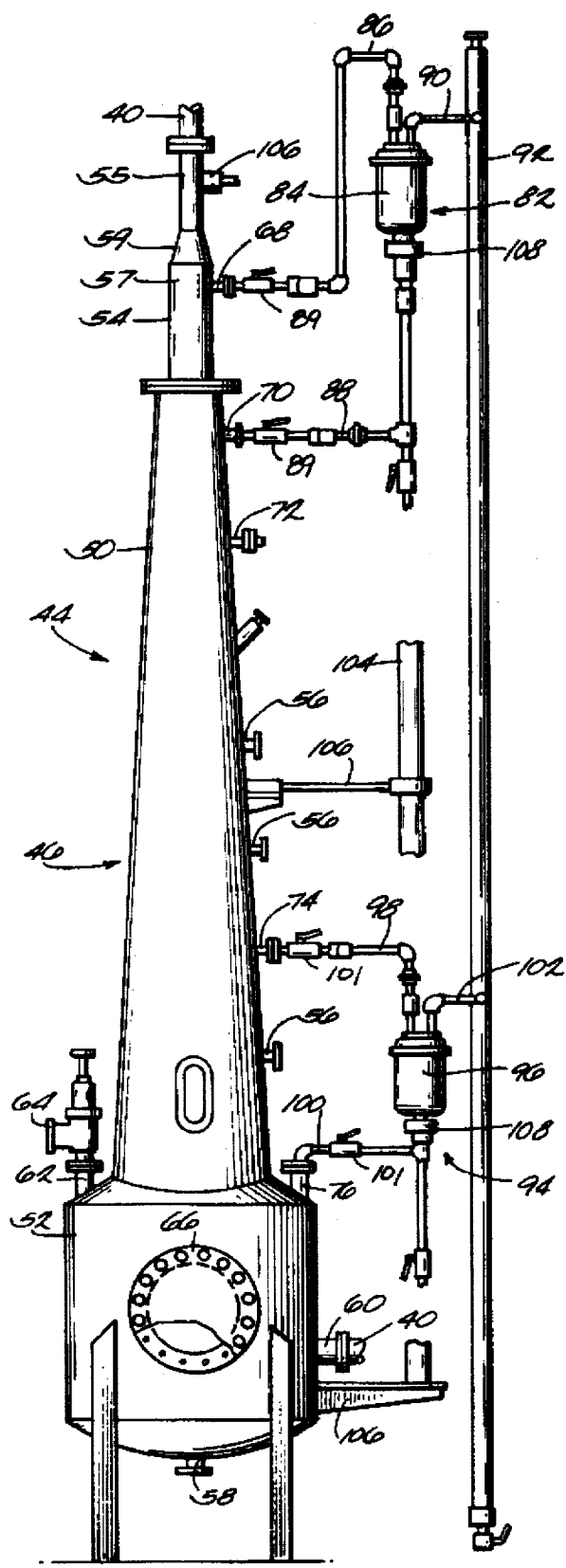
FIG. 2 is a partially cut away, enlarged elevational view of part of the gas dissolution apparatus illustrated in FIG. 1.
FIG. 3 is a cross-sectional view of the bubble contactor illustrated in FIG. 2 as part of the gas dissolution apparatus.

The gas dissolution apparatus 38 also includes means for dissolving oxygen in the treated effluent flowing through the recycle conduit 40 before this liquid is mixed with the water in the main conduit 14. While various means for dissolving oxygen in the treated effluent can be employed, in the illustrated arrangement such means includes an oxygenator 44 disposed in the recycle conduit 40 between the reactor 12 and the main conduit 14. The oxygenator 44 includes a mixing vessel or bubble contactor 46 defining a gas/liquid or bubble contact chamber 48 (FIG. 3). As shown in FIG. 2, the bubble contactor 46 includes a frustoconically-shaped section 50 which diverges downwardly into an enlarged lower section 52. The bubble contactor 46 also includes a tubular transition member 54 connected between the upper end of the section 50 and the recycle conduit 40. In a preferred form of the invention the tubular transition member 54 includes an upper end 55 connected to the recycle conduit 40 and having a diameter which is the same as conduit 40. Tubular transition member 54 further includes a lower portion 57 connected to the upper end of the frustoconically shaped section 50 and having an inside diameter smaller than the inside diameter of the upper end of the frustoconically shaped section 50 and larger than the inside diameter of the recycle conduit 40. The upper end 55 and lower portion 57 are joined by a conical section 59 of the transition member 54. The velocity of liquid flowing into the bubble contactor from the recycle conduit 40 will be reduced as the liquid enters the transition member 54 and will be reduced again as it flows into the upper and of the frustoconically shaped section. By providing the tubular transition member 54, the length of the frustoconically shaped section can be reduced.

To permit various maintenance, monitoring and control operations, the bubble contactor 46 is provided with a plurality of ports. These ports include monitoring ports 56 through which water samples can be withdrawn via valves (not shown) connected to the ports 56, a water fill port 58, an outlet port 60 connected to the recycle conduit 40, a relief port 62 on which a relief valve 64 is mounted, and a manhole port 66. For reasons more fully explained below, additional ports 68, 70, 72, 74 and 76 are also provided.

The oxygenator 44 also includes means for introducing gas into the bubble contactor 46. While various gas introduction means can be employed, in the illustrated arrangement such means includes a gas source 78 (FIG. 1) connected to the port 72 to provide oxygen enriched gas under pressure to the contact chamber 48.

To increase the dissolved oxygen content of the treated effluent entering the main conduit 14, the gas dissolution apparatus 38 also includes means for pressurizing the bubble contactor 46. While various pressurizing means can be employed, in the illustrated arrangement such means includes a pump 80 disposed in the recycle conduit 40 between the bubble contactor 46 and the reactor 12.

The gas dissolution apparatus 38 is also provided with means for venting gas from the bubble contactor 46. While various venting means can be employed, in the illustrated arrangement the venting means includes an upper vent assembly 82. The upper vent assembly 82 is operable to periodically vent gas from the upper part of the contact chamber 48 if a gas space of appreciable size develops. The upper vent assembly 82 remains closed at all other times to minimize the loss of undissolved oxygen. Such a gas space could result, for example, from the accumulation and coalescence of gas bubbles originating from gases such as nitrogen that are stripped from the treated effluent during the oxygenation process. Additionally, the gas space can potentially include residual fuel constituents stripped from the treated effluent during oxygenation. By venting the bubble contactor 46 when a gas space develops the formation of a mixture of undissolved oxygen and stripped gasoline constituents sufficient to present even a minimal risk of combustion within the bubble contactor 46 is reduced. Like the reactor 12, the bubble contactor 46 is electrically grounded.

As shown in FIG. 2, the upper vent assembly 82 includes an air release valve 84 that is preferably a float-operated valve, such as is produced by Val-Matic Valve and Manufacturing Corp., Elmhurst, Ill. The upper vent assembly 82 also includes conduits 86 and 88 connecting the upper and lower parts of the valve 84 to the ports 68 and 70, respectively, and a conduit 90 connecting the valve 84 to a vent conduit 92. When a gas space of sufficient size to overcome the downflow velocity and turbulence within the contact chamber 48 rises to the upper part of the contact chamber 48, the valve 84 will open to vent the gas space through the vent conduit 92.

While the operation of the tubular transition section 54 is not fully understood, in operation, it appears that in the event bubbles begin to coalesce in the bubble contactor, a free gas space tends to form in the top of the tubular transition section member 54 thereby triggering venting of gas from the bubble contactor through the gas vent 82, and the efficient operation of the bubble contactor can then continue.

The venting means also includes a lower vent assembly 94 including an air release valve 96 preferably identical to the valve 84. The lower vent assembly 94 also includes conduits 98 and 100 connecting the upper and lower parts of the valve 96 to the ports 74 and 76, respectively, and a conduit 102 connecting the valve 96 to the vent conduit 92. Like the upper valve 84, the lower valve 96 opens to vent the system only when a concentration of undissolved gas bubbles sufficient to actuate the float mechanism in the valve 96 is present in the lower part of the bubble contactor 46. The valve 96 remains closed at other times. By preventing the escape of gas bubbles from the bubble contactor 46, these bubbles are prevented from reaching the reactor 12 where they can degrade reactor performance.

Means are provided for supporting the upper and lower vent assemblies 82 and 94. While various support means can be employed, in the illustrated arrangement the support means includes a vertical channel 104 and a plurality of support members 106 supporting the channel 104 on the bubble contactor 46. Brackets 108 are provided to mount the valves 84 and 96 on the channel 104.

The gas dissolution apparatus 38 also includes means for mixing the pressurized and oxygenated treated effluent in the recycle conduit 40 with the relatively low pressure water in the main conduit 14. As shown in FIG. 1, the mixing means includes a mixing device 110 positioned at the juncture of the recycle conduit 40 and the main conduit 14 (FIG. 1).

Referring to FIG. 4, the mixing device 110 includes a tubular member 112 that is connected as part of the main conduit 14. The tubular member 112 includes interconnected elbow and straight pipe sections 114 and 116 defining a mixing chamber 118 that forms part of the flow passage defined by the main conduit 14. The pipe section 116 includes an inner diameter surface 120 and a longitudinal axis 122.

The mixing device 110 also includes means for introducing the recycled treated effluent into the water in the main conduit 14. In the particular embodiment of the invention illustrated in the drawings, the means for introducing the recycled treated effluent includes an elongated tubular probe member 124 forming a terminal end of the recycle conduit 40 and projecting into the mixing chamber 118 in coaxial relation to the pipe section 116. To support the probe member 124, the elbow section 114 is provided with an outwardly extending hollow spool member 126 coaxial with the pipe section 116. The probe member 118 includes a pair of spaced apart flanges 128 and 130 at one end thereof to facilitate attachment of the probe member 124 to the recycle conduit 40 and to the spool member 126, respectively. The probe member 118 also includes a cylindrical wall 132 spaced radially inwardly from and opposing the inner diameter surface 120 of the pipe section 116.

To accomplish quick, turbulent mixing of the two liquids so as to minimize evolution of dissolved oxygen, the probe member 124 is provided with means for directing the oxygenated recycled effluent into the mixing chamber 118 in the form of a plurality of liquid "jets". While various directing means can be employed, in the illustrated arrangement such means includes a plurality of orifices 134 (FIG. 5) provided in the cylindrical wall 132 of the probe member 118 for emitting the recycled effluent pressurized by the pump 80. The "jets" of recycled effluent present a large surface area to the untreated water flowing through the main conduit 14 to enhance mixing of the liquids and the transfer of dissolved oxygen to the untreated water. To enhance turbulence and thus promote rapid mixing, each of the orifices 134 includes an axis 136 (FIG. 6) extending perpendicularly to the axis 122 so that the "jets" are introduced into the mixing chamber 118 perpendicularly to the direction of flow. Each orifice 134 preferably has a diameter of about one quarter inch and introduces treated effluent into the mixing chamber 118 at a rate of about 8 gpm when the bubble contactor 46 is operated at about 40 psig.

To further limit evolution of gas and formation of gas bubbles as the two liquids are mixed, means for dispersing the recycled effluent throughout the cross-sectional area of the mixing chamber 118 is provided. While various dispersing means can be employed, in the illustrated arrangement the orifices 134 are arranged in axially spaced rows and are approximately evenly distributed over the circumference of the probe member 118 to evenly distribute the recycled effluent.

The mixing device 110 is also provided with means for maintaining the probe member 124 in coaxial relation to the pipe section 116 to prevent the "jets" from unduly impinging on the inner diameter surface 120 of the pipe section 116. While various means for maintaining the probe member 124 in coaxial relation can be employed, in the illustrated arrangement such means includes a plurality of circumferentially arranged and radially inwardly extending straightening vanes 138 on the pipe section 116 (FIG. 5). In operation, the liquid treatment apparatus 10 is supplied with contaminated water containing relatively low quantities of dissolved oxygen. This water is pumped through the main conduit 14 to the reactor 12 for treatment. Prior to entering the reactor 12, the water is provided with dissolved oxygen. This is accomplished by recycling some of the treated effluent being discharged from the reactor 12 and pumping this recycled liquid through the oxygenator 44 before reintroducing it into the main conduit 14. More particularly, some of the treated effluent is withdrawn from the outlet 22 of the reactor 12 and pumped through the recycle conduit 40 and the bubble contactor 46. Oxygen containing gas from the gas source 78 is introduced into the bubble contactor 46 to provide the recycled effluent with an increased dissolved oxygen content. The oxygenated effluent from the bubble contactor 46 is then introduced into the oxygen deficient untreated water in the main conduit 14 through the mixing device 110 to form a stream having an intermediate dissolved oxygen content sufficient to sustain the microorganisms in the bed 34. This water is then fed to the reactor 12 where it is treated to remove most or all of the fuel constituents therefrom before being discharged from the reactor 12. The treated effluent not recycled can be disposed of at a remote location or subjected to further downstream treatment, as desired.

In one application, for example, treated effluent is withdrawn from the reactor 12 through the recycle conduit 40 at a flow rate of about 420 gpm and the pressure developed in the bubble contactor 46 by the pump 80 is maintained at about 40 psig. Sufficient oxygen is introduced into the bubble contactor 46 to achieve a dissolved oxygen content in the recycled effluent of about 88 mg/l, and the pump 80 and the gas source 78 are adjusted to provide a flow rate of recycled effluent in which substantially all of the oxygen introduced by the source 82 is dissolved. The untreated water in the main conduit 14 has substantially no dissolved oxygen and is pumped through the main conduit 14 at a flow rate of about 1,780 gpm and a pressure of about 10–15 psig. The resulting stream formed by mixing the recycled effluent with the contaminated water in the main conduit 14 has a flow rate of about 2,200 gpm and a dissolved oxygen content of about 17 mg/l.

Advantageously, the oxygenator 44 is positioned in a sidestream (i.e. the recycle conduit 40) to oxygenate relatively contaminant-free water (i.e. the treated reactor effluent). By subjecting relatively contaminant-free water to oxygenation in the bubble contactor 46, the risk of developing a combustible mixture of contaminants and oxygen and the potential severity of a combustion resulting therefrom are reduced relative to prior art arrangements in which contaminant-laden water is passed through an oxygenator. Additionally, the bubble contactor 46 is pressurized by the pump 80 to increase oxygen solubility in order to dissolve substantially all of the oxygen introduced into the bubble contactor 46 and to thereby increase the dissolved oxygen content of the treated effluent fed to the main conduit 14. By achieving substantially complete oxygen dissolution the gas recycle equipment needed in prior art arrangements is eliminated, the waste of undissolved oxygen through the vents is greatly reduced, and the threat of combustion within the system is further reduced by the lack of gaseous oxygen available to combine with fuel constituents. Also, by achieving a higher dissolved oxygen content lower flow rates of recycled reactor effluent are needed to supply sufficient dissolved oxygen to the untreated water in the main conduit 14. Thus, the size of the oxygenator 44 and the pumping requirements of the system are reduced relative to prior art arrangements in which all of the water to be treated is passed through a bubble contactor for oxygenation.

Various features and advantages of the invention are set forth in the following claims.

We claim:

1. A method for dissolving oxygen in a first liquid flowing through a main conduit, the main conduit delivering the first liquid to a reactor wherein the first liquid is treated and discharged as treated effluent, said method comprising the steps of providing a second liquid, introducing an oxygen containing gas into the second liquid to provide the second liquid with an increased dissolved oxygen content, introducing the second liquid with increased dissolved oxygen content into the first liquid in the main conduit to increase the dissolved oxygen content of first liquid prior to delivering the first liquid into the reactor for treatment.

2. A method for dissolving oxygen in a first liquid as set forth in claim 1 wherein said step of providing the second liquid includes the step of withdrawing a portion of the treated effluent from the reactor.

3. A method for dissolving oxygen in a first liquid as set forth in claim 2 wherein the oxygen containing gas is introduced into the withdrawn portion of the treated effluent to provide said portion of the treated effluent with an increased dissolved oxygen content, and wherein said portion of the treated effluent with increased dissolved oxygen content is thereafter introduced into the first liquid in the main conduit to increase the dissolved oxygen content of the first liquid prior to delivering the first liquid into the reactor for treatment.

4. A method for dissolving oxygen in a first liquid as set forth in claim 3 wherein said method further comprises the step of pressurizing the withdrawn portion of the treated effluent prior to introducing the oxygen containing gas into said withdrawn portion of the treated effluent by pumping said withdrawn portion of the treated effluent through a recycle conduit connected between the reactor and the main conduit, and wherein said step of introducing the oxygen containing gas includes the step of introducing the oxygen containing gas into said withdrawn portion of the treated effluent being pumped through said recycle conduit.

5. A method for dissolving oxygen in a first liquid as set forth in claim 1 wherein said method further comprises the step of pressurizing the second liquid prior to introducing the oxygen containing gas into the second liquid.

6. A method for treating liquid to remove contaminants therefrom, said method comprising the steps of withdrawing liquid from a liquid source, providing the liquid from the liquid source with an increased dissolved oxygen content by pumping the liquid from the liquid source through a conduit to a vessel, the vessel having an enlarged cross-sectional area relative to the conduit, and adding oxygen to the liquid from the liquid source so that the oxygen dissolves in the liquid from liquid source when that liquid is in the vessel, and thereafter introducing the liquid from the liquid source into a liquid to be treated to increase the dissolved oxygen content of the liquid to be treated, and introducing the liquid to be treated into a reactor including a reactor tank and a media bed, the media bed including particulate solids and biological material supported on the particulate solids, the liquid to be treated being passed through the bed of material so that the biological material reacts with the liquid to be treated to produce a treated reactor effluent.

7. A method for treating liquid as set forth in claim 6 wherein the liquid source is the treated reactor effluent and said step of withdrawing liquid from the liquid source includes withdrawing liquid from the treated effluent.

* * * * *